(12) United States Patent
Gantie et al.

(10) Patent No.: US 7,971,684 B2
(45) Date of Patent: Jul. 5, 2011

(54) ACOUSTIC PANEL

(75) Inventors: Fabrice Gantie, Toulouse (FR);
Bernard Duprieu, Toulouse (FR);
Valerie Frustie, Toulouse (FR); Alain Porte, Colomiers (FR); Thomas Gilles, Toulouse (FR); Jacques Lalane, Saint Orens de Gameville (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/528,017

(22) PCT Filed: Feb. 19, 2008

(86) PCT No.: PCT/FR2008/050273
§ 371 (c)(1),
(2), (4) Date: Aug. 20, 2009

(87) PCT Pub. No.: WO2008/113931
PCT Pub. Date: Sep. 25, 2008

(65) Prior Publication Data
US 2010/0116587 A1      May 13, 2010

(30) Foreign Application Priority Data
Feb. 20, 2007   (FR) ..................................... 07 53364

(51) Int. Cl.
*E04B 1/82* (2006.01)
(52) U.S. Cl. ........ 181/292; 181/290; 181/284; 244/1 N; 415/119
(58) Field of Classification Search .................. 181/290, 181/292, 284; 244/1 N; 415/119
See application file for complete search history.

(56) References Cited

U.S. PATENT DOCUMENTS

| | | | |
|---|---|---|---|
| 4,487,793 A | 12/1984 | Haines, Jr. et al. | |
| 5,653,836 A | 8/1997 | Mnich et al. | |
| 6,290,022 B1 * | 9/2001 | Wolf et al. | 181/292 |
| 6,607,625 B2 | 8/2003 | Andre et al. | |
| 6,615,950 B2 * | 9/2003 | Porte et al. | 181/292 |
| 6,755,280 B2 | 6/2004 | Porte et al. | |
| 6,772,857 B2 | 8/2004 | Porte et al. | |
| 6,827,180 B2 * | 12/2004 | Wilson | 181/292 |

(Continued)

FOREIGN PATENT DOCUMENTS

| | | |
|---|---|---|
| EP | 1 111 584 | 6/2001 |
| FR | 2 821 788 | 9/2002 |

(Continued)

OTHER PUBLICATIONS

International Search Report dated Sep. 29, 2008, from corresponding PCT application.

*Primary Examiner* — Forrest M Phillips
(74) *Attorney, Agent, or Firm* — Young & Thompson

(57) ABSTRACT

A panel for acoustic treatment connected to a surface of an aircraft, includes—from the outside to the inside—an acoustically resistive porous layer, at least one alveolar structure, and a reflective or impermeable layer, whereby the acoustically resistive porous layer includes—at the outside surface that can be in contact with the aerodynamic flows—one sheet or piece of sheet metal including open zones (14) that allow sound waves to pass and filled zones (16) that do not allow sound waves to pass, characterized in that the sheet or piece of sheet metal of the acoustically resistive layer includes sets of microperforations (18), whereby each set of microperforations forms an open zone (14), the sets of microperforations being separated from one another by at least one series of bands separated by filled zones (16).

10 Claims, 1 Drawing Sheet

U.S. PATENT DOCUMENTS

Figure 1:
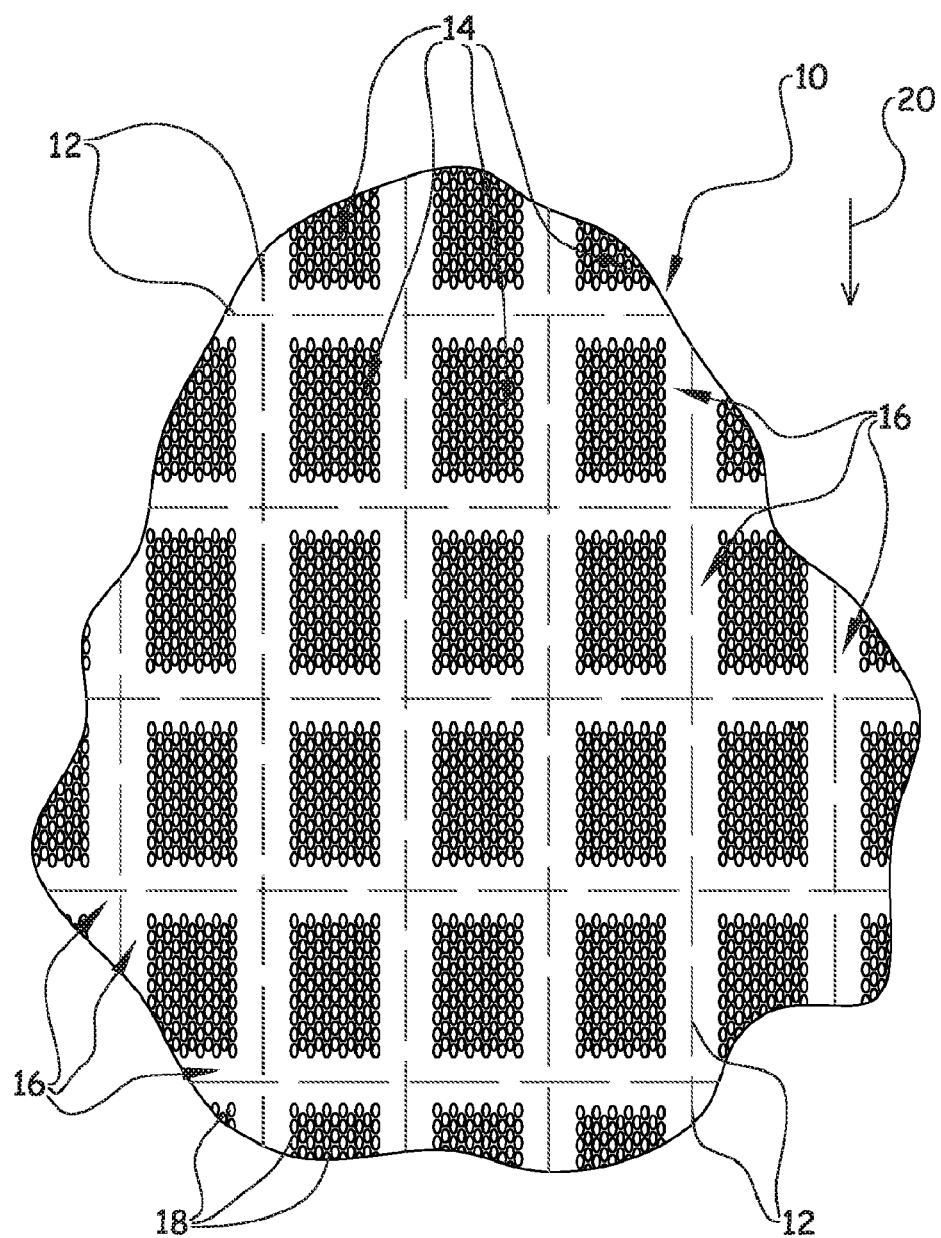

| | | | |
|---|---|---|---|
| 6,977,109 B1 * | 12/2005 | Wood | 428/131 |
| 2007/0272483 A1 * | 11/2007 | Morin et al. | 181/292 |
| 2008/0118699 A1 | 5/2008 | Jumel | |
| 2008/0251315 A1 * | 10/2008 | Ayle | 181/292 |

FOREIGN PATENT DOCUMENTS

| | | |
|---|---|---|
| FR | 2 844 304 | 3/2004 |
| FR | 2 865 309 | 7/2005 |
| WO | 01/48734 | 7/2001 |

\* cited by examiner

ACOUSTIC PANEL

This invention relates to a panel for acoustic treatment that is designed to be connected to a surface of an aircraft and more particularly to the acoustically resistive layer of said panel.

To limit the impact of the sound pollution close to airports, the international standards are increasingly restrictive as far as sound emissions are concerned.

Techniques have been developed for reducing the noise that is emitted by an aircraft, and in particular the noise that is emitted by a propulsion unit, by arranging, at walls of the tubes, coatings that are designed to absorb a portion of the sound energy, in particular by using the principle of Helmholtz resonators. In a known manner, a coating for acoustic treatment, also called an acoustic panel, comprises—from the outside to the inside—an acoustically resistive porous layer, at least one alveolar structure, and a reflective or impermeable layer.

The acoustically resistive layer is a porous structure that plays a dissipative role, partially transforming the acoustic energy of the sound wave that passes through it into heat. It comprises so-called open zones that are able to allow acoustic waves to pass and other so-called closed or filled zones that do not allow the sound waves to pass but are designed to ensure the mechanical strength of said layer. This acoustically resistive layer is characterized in particular by an open surface ratio that varies essentially based on the engine, and components that constitute said layer.

An acoustically resistive layer is subjected to different stresses.

The acoustically resistive layer that is in contact with the aerodynamic flows is subjected to strong stresses.

Acoustically resistive layers are described in particular in the documents FR-2,844,304 and FR-2,821,788.

The openings that are made in the acoustically resistive layer generate disruptions of aerodynamic flows flowing on the surface of the acoustically resistive layer that reduce the aerodynamic characteristics of the aircraft. However, these disruptions are essentially proportional to the cross-section of the openings.

However, the reduction in the cross-section of the openings means that the number of openings needed to obtain an equivalent open ratio is significantly increased. However, the multiplication of the openings generally tends to embrittle the acoustically resistive layer and to increase the production costs.

Also, the purpose of this invention is to propose a panel for the acoustic treatment in which the acoustically resistive layer has optimized mechanical and aerodynamic characteristics.

For this purpose, the invention has as its object a panel for the acoustic treatment connected to a surface of an aircraft, comprising—from the outside to the inside—an acoustically resistive porous layer, at least one alveolar structure, and a reflective or impermeable layer, whereby said acoustically resistive porous layer comprises—at the outside surface that can be in contact with the aerodynamic flows—one sheet or piece of sheet metal comprising open zones that allow sound waves to pass and filled zones that do not allow sound waves to pass, characterized in that the sheet or piece of sheet metal of the acoustically resistive layer comprises sets of microperforations, whereby each set of microperforations forms an open zone, the sets of microperforations being separated from one another by at least one series of bands separated by filled zones.

This solution is optimal for the aerodynamic characteristics owing to the presence of microperforations and for the mechanical characteristics owing to the filled zones in the form of bands that ensure the absorption of stresses.

Figure 2:
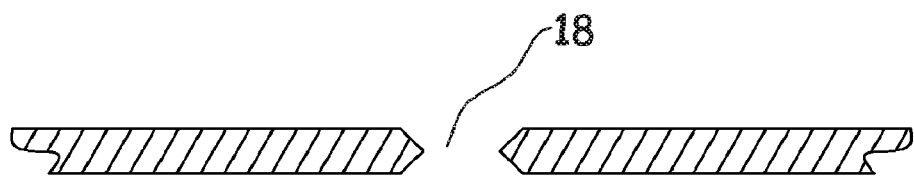

Other characteristics and advantages will emerge from the following description of the invention, a description that is provided only by way of example, with regard to the accompanying drawings, in which:

FIG. 1 is an elevation view of an acoustically resistive layer according to the invention, and FIG. 2 is a cutaway illustrating a perforation profile variant.

Techniques have been developed for reducing the noise that is emitted by an aircraft, and in particular the noise that is emitted by a propulsion unit, by arranging, at walls of the tubes, coatings that are designed to absorb a portion of the sound energy, in particular by using the principle of Helmholtz resonators. In a known manner, a coating for acoustic treatment, also called an acoustic panel, comprises—from the outside to the inside—an acoustically resistive porous layer, at least one alveolar structure, and a reflective or impermeable layer.

Layer is defined as one or more layers that may or may not be of the same type.

A honeycomb structure is used to form the alveolar structure.

A piece of sheet metal is generally used to form the impermeable reflective layer.

Different types of materials can be used for the honeycomb and the reflective piece of sheet metal.

In FIG. 1, an acoustically resistive layer is shown at 10 with the side walls 12 of an alveolar structure in dotted lines.

According to a known embodiment, the alveolar structure is produced from a honeycomb.

According to a preferred embodiment, the alveolar structure comprises, on the one hand, a number of first bands called longitudinal bands that are arranged in radial planes incorporating the longitudinal axis of the nacelle, and, on the other hand, a number of second bands called transverse bands that are secant with the radial planes. Preferably, at each point of intersection with the transverse bands, each longitudinal band is approximately perpendicular to the tangent of each transverse band at the point under consideration.

According to an important advantage of this embodiment, the bands are optionally shaped prior to assembly and are no longer deformed once assembled or when the reflective or acoustically resistive layers are installed.

Whereby the thus formed acoustic panel has shapes that are adapted to those of the surface to be treated, it is no longer deformed during its installation. Consequently, the connection between the alveolar structure and the reflective layer or the acoustically resistive layer no longer runs the risk of being damaged, and the position of the side walls 12 of the tubes delimited by the transverse and longitudinal bands is perfectly known.

The acoustically resistive layer 10 is a porous structure that has a dissipative role, partially transforming into heat the acoustic energy of the sound wave that passes through it. It comprises zones called open zones 14 that can allow the acoustic waves to pass and other so-called closed zones 16 or filled zones that do not allow the sound waves to pass but are designed to ensure the mechanical strength of said layer. This acoustically resistive layer 10 is characterized in particular by an open zone ratio that varies essentially based on the engine, whereby components constitute said layer.

The open zones 14 of the acoustically resistive layer are arranged based on the position of the side walls 12 of the alveolar structure so as to empty into the cavities that are delimited by the side walls 12 and not in a way that overlaps with the side walls 12.

At the outside surface that can be in contact with the aerodynamic flows, the acoustically resistive layer 10 comprises a sheet or piece of sheet metal that comprises open zones 14 that are separated by filled zones 16, whereby said filled zones 16 define a network that allows the absorption of stresses.

As appropriate, the acoustically resistive layer comprises a single sheet or piece of sheet metal or a complex that comprises at least one piece of sheet metal or sheet and at least one woven material or a non-woven material.

According to the invention, the filled zones 16 define at least one series of bands that are separated so as to delimit open zones 14. According to one embodiment, the filled zones 16 define bands, a first series of bands arranged in a first direction and a second series of bands arranged in a second direction that is secant with the first direction (approximately perpendicular according to the illustrated example), whereby the bands of each series are separated so as to delimit open zones 14. The bands that form the filled zones 16 are arranged facing the side walls 12. As a variant, more than two series of bands could be considered.

Advantageously, the width of the bands of filled zones is at most equal to the smallest of the following values:

10 mm;
30% of the width of the open zones 14.

The filled zones 16 are suitable for ensuring the structural function and the absorption of stresses, in particular in the first direction and in the second direction. According to variants, the filled zones 16 can allow the passage of a hot-air or electric defrosting circuit.

According to the invention, the open zones 14 comprise a number of microperforations 18 whose largest dimension is less than 2 mm and preferably is less than 1.2 mm.

According to the invention, the sheet or piece of sheet metal of the acoustically resistive layer comprises sets of microperforations 18, whereby each set of microperforations forms an open zone 14, and the sets of microperforations are separated from one another by at least one series of separated bands constituted by filled zones 16.

According to one embodiment, the microperforations 18 have an oblong shape whose largest dimension is oriented in the direction 20 of the flows flowing on the surface of the acoustically resistive layer. This shape makes it possible to increase the effectiveness of the microperforations 18.

Preferably, the microperforations 18 are aligned along several lines for the same open zone and arranged in staggered rows from one line to the next.

According to one embodiment, the microperforations 18 have a profile that flares at least on one surface. According to one embodiment, the microperforations have a profile as defined in FIG. 2. Thus, the cross-section of the microperforation 18 has a diabolo profile, with a reduced section that is enlarged on both sides so as to empty onto the surface with wider cross-sections. This type of profile is advantageous for aerodynamic functions.

The acoustically resistive layer can comprise perforations or microperforations that are provided for linking the inside of the cells of the alveolar structure with the outside, whereby certain perforations or microperforations are thus designed for acoustic treatment and others for frost treatment.

Advantageously, at least the perforations or microperforations that are provided for the frost treatment are inclined and are not normal with respect to the outside surface of the acoustically resistive layer so as to evacuate the hot air in a laminar manner at the outside surface that is to be treated. This configuration also makes it possible to reduce the risk of obstruction of holes (perforations or microperforations), in particular by pollution.

According to a first embodiment, the microperforations 18 are produced by perforation by means of an electron beam, either in continuous-pulse mode or in multi-pulse percussion or passing mode.

According to another embodiment, the perforations that are made at the acoustically resistive layer can be produced by chemical machining. However, the invention is not limited to this embodiment.

As a variant, it is possible to first make a zone of smaller thickness, in particular by chemical machining, at zones where microperforations will be made while keeping non-perforated zones thicker to ensure mechanical strength.

In a first step, a mask that covers the parts that should not be perforated is applied. Next, an attack solution is applied on the surface that, facing zones that are not protected by the mask, goes through an electrochemical process to dissolve the metal and create perforations. Preferably, the piece of sheet metal that is to be perforated is immersed in an attack solution.

Advantageously, the piece of sheet metal is metal, preferably titanium, and the attack solution is adapted to the material of the piece of sheet metal to induce the phenomenon of corrosion of said materials so as to produce a perforation.

By way of example, the machining range can be as follows:
Preparation of the surface so as to produce better adhesion of the mask and by making its removal possible by simple peeling,
Installation of the mask over the entire surface,
Removal of a portion of the mask so as to show the zones to be machined,
Immersion in the attack solution,
Rinsing,
Optional neutralization,
Rinsing,
Drying,
Final unmasking.

This solution for producing perforations has the advantage of not subjecting the piece of sheet metal to a localized heating that can produce residual stresses as machining using a laser beam could do or without lifting the material as conventional machining could do.

Thus, this solution produces less significant residual stresses, which makes it possible to increase the service life of the part and to reduce maintenance operations. Thus, the monitoring visits and the maintenance operations are spaced apart, which makes it possible to reduce the aircraft's down time.

According to another advantage, this solution makes it possible not to deform the part during the perforation.

Advantageously, this machining operation is carried out on a piece of sheet metal that is already shaped according to the shape of the alveolar structure. Next, the acoustically resistive layer is connected by welding to the alveolar structure.

Chemical machining can cause foreign elements (ions) to become trapped in a crystalline network of the piece of sheet metal. During assembly, the welding operation causes an elevation of temperature that makes it possible to release these foreign elements. Consequently, this operation makes it possible to reduce residual stresses also.

The invention claimed is:

1. Panel for acoustic treatment connected to a surface of an aircraft, from the outside to the inside, comprising:
   an acoustically resistive porous layer,
   at least one alveolar structure, and
   a reflective or impermeable layer,
      wherein said acoustically resistive porous layer comprises—at the outside surface that can be in contact with the aerodynamic flows—one sheet or piece of sheet metal comprising open zones (14) that allow sound waves to pass and filled zones (16) that do not allow sound waves to pass, and wherein the sheet or piece of sheet metal of the acoustically resistive layer comprises sets of microperforations (18), each set of microperforations forming one said open zone (14), wherein the filled zones (16) define bands for ensuring the structural function and the absorption of stresses, a first series of bands arranged in a first direction and a second series of bands arranged in a second direction that is secant with the first direction, the bands of each series being spaced so as to separate each set of microperforations (18), wherein the microperforations (18) have oblong shapes whose largest dimension is oriented in the direction of the flows that flow at the surface of the acoustically resistive layer, and wherein the microperforations (18) are aligned along several lines for the same set (14) and arranged in staggered rows from one line to the next.

2. Panel for acoustic treatment according to claim 1, wherein the width of the bands of filled zones is at most equal to the smallest of the following values:

10 mm;

30% of the width of the open zones (14).

3. Panel for acoustic treatment according to claim 1, wherein the microperforations (18) have a large dimension that is less than 2 mm.

4. Nacelle that comprises a panel for acoustic treatment according to claim 1.

5. Aircraft that comprises a panel for acoustic treatment according to claim 1.

6. Panel for acoustic treatment according to claim 2, wherein the microperforations (18) have a large dimension that is less than 2 mm.

7. Panel for acoustic treatment according to claim 1, wherein the cross-section of the microperforations (18) has a diabolo profile, with a reduced section that is enlarged on both sides so as to empty onto the surface with wider cross-sections.

8. Panel for acoustic treatment connected to a surface of an aircraft, from the outside to the inside, comprising:

an acoustically resistive porous layer, at least one alveolar structure, and a reflective or impermeable layer, wherein said acoustically resistive porous layer comprises—at the outside surface that can be in contact with the aerodynamic flows—one sheet or piece of sheet metal comprising open zones (14) that allow sound waves to pass and filled zones (16) that do not allow sound waves to pass, and wherein the sheet or piece of sheet metal of the acoustically resistive layer comprises sets of microperforations (18), each set of microperforations forming one said open zone (14), wherein the filled zones (16) define bands for ensuring the structural function and the absorption of stresses, a first series of bands arranged in a first direction and a second series of bands arranged in a second direction that is secant with the first direction, whereby the bands of each series are spaced so as to separate each set of microperforations (18), wherein the microperforations (18) have oblong shapes whose largest dimension is oriented in the direction of the flows that flow at the surface of the acoustically resistive layer, wherein the microperforations (18) are aligned along several lines for the same set (14) and arranged in staggered rows from one line to the next, and wherein the cross-section of the microperforations (18) has a diabolo profile, with a reduced section that is enlarged on both sides so as to empty onto the surface with wider cross-sections.

9. Panel for acoustic treatment connected to a surface of an aircraft, from the outside to the inside, comprising:

an acoustically resistive porous layer, at least one alveolar structure, and a reflective or impermeable layer, wherein said acoustically resistive porous layer comprises—at the outside surface that can be in contact with the aerodynamic flows—one sheet or piece of sheet metal comprising open zones (14) that allow sound waves to pass and filled zones (16) that do not allow sound waves to pass, and wherein the sheet or piece of sheet metal of the acoustically resistive layer comprises sets of microperforations (18), each set of microperforations forming one said open zone (14), wherein the filled zones (16) define bands for ensuring the structural function and the absorption of stresses, a first series of bands arranged in a first direction and a second series of bands arranged in a second direction that is secant with the first direction, whereby the bands of each series are spaced so as to separate each set of microperforations (18), wherein the microperforations (18) have oblong shapes whose largest dimension is oriented in the direction of the flows that flow at the surface of the acoustically resistive layer, wherein the microperforations (18) are aligned along several lines for the same set (14) and arranged in staggered rows from one line to the next, and the rows overlap one another in the direction of the flows and in such a way that the microperforations are imbricated without intersecting from one row to another one.

10. Panel for acoustic treatment according to claim 9, wherein the cross-section of the microperforations (18) has a diabolo profile, with a reduced section that is enlarged on both sides so as to empty onto the surface with wider cross-sections.

* * * * *